United States Patent [19]

Bhola et al.

[11] Patent Number: 5,326,731
[45] Date of Patent: Jul. 5, 1994

[54] CERAMIC COMPOSITIONS FOR WEAR RESISTANT APPLICATIONS

[75] Inventors: Rakesh Bhola; Sankar Dasgupta; James K. Jacobs, all of Toronto, Canada

[73] Assignee: Electrofuel Manufacturing Company, Toronto, Canada

[21] Appl. No.: 154,039

[22] Filed: Nov. 18, 1993

[51] Int. Cl.$^5$ .................... C04B 35/10; B24D 3/24
[52] U.S. Cl. ........................ 501/87; 501/95; 501/98; 51/309
[58] Field of Search ............ 501/87, 95, 98; 51/309

[56] References Cited

U.S. PATENT DOCUMENTS

| | | | |
|---|---|---|---|
| 4,320,203 | 3/1982 | Brandt et al. | 501/87 |
| 4,356,272 | 10/1982 | Kanemitsu et al. | 501/87 |
| 4,366,254 | 12/1982 | Rich et al. | 501/89 |
| 4,407,970 | 10/1983 | Komatsu et al. | 501/97 |
| 4,543,343 | 9/1985 | Iyori et al. | 501/87 |
| 4,689,077 | 8/1987 | Chevigne et al. | 75/233 |
| 4,745,091 | 5/1988 | Landingham | 501/87 |
| 4,804,645 | 2/1989 | Ekstrom | 501/105 |
| 4,852,999 | 8/1989 | Mehrotra et al. | 51/309 |
| 4,867,761 | 9/1989 | Brandt et al. | 51/309 |
| 5,017,524 | 5/1991 | Moskowitz et al. | 501/87 |
| 5,141,901 | 8/1992 | Brandt | 501/87 |
| 5,188,908 | 2/1993 | Nishiyama et al. | 501/98 |
| 5,275,981 | 1/1994 | Nishiyama et al. | 501/98 |

Primary Examiner—Mark L. Bell
Assistant Examiner—Deborah Jones

[57] ABSTRACT

A composition for hard, sintered, tough and wear resistant ceramic articles is described. The composition is comprised of alumina, titanium carbonitride and filaments of titanium diboride or titanium nitride. The ceramic articles made of this composition are isostatically hot pressed or sintered at high temperature in inert gas. The density of the ceramic articles is usually in excess of 99% theoretical density and the hardness is greater than 20 GPa. The process was applied to manufacture ceramic cutting inserts of the above composition.

7 Claims, 4 Drawing Sheets

Magnification 500 x

Magnification 500 x

Magnification 500 x

CERAMIC COMPOSITIONS FOR WEAR RESISTANT APPLICATIONS

FIELD OF THE INVENTION

This invention relates to oxide-based compositions for hard ceramic particles, more particularly to compositions for wear resistant cutting inserts having a ceramic second phase embedded in the oxide-based matrix.

BACKGROUND TO THE INVENTION

Alumina-based ceramic compositions have been used for cutting tools, nozzles and in similar applications, where high performance in wear resistance, hardness and fracture toughness are requirements.

An earlier ceramic cutting tool composition is described, for instance, in U.S. Pat. No. 4,366,254 issued to Rich et al. on Dec. 28, 1982, essentially consisting of alumina and zirconia in which refractory metal carbides, nitrides and carbonitrides are homogeneously dispersed. The composition further contains less than 1 percent iron group metals. Landingham in U.S. Pat. No. 4,745,091 issued on May 17, 1988, describes another wear resistant composition containing a predominantly alumina matrix supplemented with other oxides such as zirconia, magnesia and hafnia, the oxides being further modified with silicon nitride or aluminum nitride, and having dispersed within the above two phases small particles of carbides, nitrides and/or carbonitrides of refractory metals. Yet another composition for cutting inserts is described by Iyori et al. in U.S. Pat. No. 4,543,343 issued on Sep. 24, 1985, which comprises titanium carbide and/or titanium boride particles dispersed uniformly in alumina and zirconia containing matrix. The composition of Iyori et al. also contains stabilizing and sintering aids, such as magnesium oxide, yttria and aluminium nitride.

It is to be noted that the above described compositions provided hard and substantially wear resistant ceramic articles, however, the cutting inserts made of such compositions were still subject to chipping and crack formation due to thermal stress. Further cutting insert developments were intended to overcome the above shortcomings by incorporating carbide and nitride whiskers into the oxide matrix.

U.S. Pat. No. 4,852,999 issued to Mehrotra et al. on Aug. 1, 1989, describes a ceramic composition having an alumina matrix, in which single crystal titanium carbide whiskers have been dispersed. The size of the whiskers ranges between 0.25 and 3 $\mu$m cross-sectional width, and according to Mehrotra et al. may have lengths up to 150 $\mu$m. The composition of Mehrotra et al. contains zirconia as the preferred sintering aid. Brandt et al in U.S. Pat. No. 4,867,761 issued on Sep. 19, 1989, teach a similar ceramic cutting insert consisting of alumina-zirconia matrix in which whiskers of carbides, nitrides and/or borides of titanium and/or zirconium are homogeneously dispersed. The composition of Brandt et al. may also contain silicon carbide whiskers. The whiskers of Brandt et al. are monocrystals, having 0.5–10 $\mu$m diameter and 2.5–100 $\mu$m length, and aspect ratio ranging between 5–10. Yet other similar compositions containing additionally chromium compounds, or whiskers of tantalum compounds are described in U.S. Pat. Nos. 4,804,645 and 5,141,901 issued to Ekstrom on Feb. 14, 1989 and Brandt on Aug. 25, 1992, respectively. The whiskers in the above cutting tool compositions are added to increase strength and chipping resistance. Moreover, it is known that these substances added in the form of whiskers, increase heat conductivity and thereby reduce thermal cracking of the alumina matrix.

It is, however, known that whiskers, especially refractory substance containing whiskers, may be highly carcinogenic and environmentally harmful. Whiskers which are considered harmful have usually less than 4 $\mu$m diameter. The harmful effects of the whiskers may be manifested during the preparation of the composition, as well as during usage of the sintered ceramic article made of a whisker containing composition.

The object of the present invention is to provide an alumina based composition for hard, sintered, wear resistant ceramic articles, which are also resistant to chipping and thermal cracking, while substantially eliminating the harmful side effects of ceramic whiskers.

STATEMENT OF THE INVENTION

A new ceramic composition for hard, sintered ceramic articles has been found, which contains polycrystalline filaments having diameter in excess of 4 $\mu$m, embedded in alumina-based matrix.

The composition for a hard sintered ceramic article essentially consists of:

50–80% by volume alumina,

5–40% by volume titanium carbonitride, the nitride and carbide content in said carbonitride being defined such that the fraction C/C+N has a value between 0.1 and 1, 1–30% by volume polycrystalline filaments selected from the group consisting of titanium diboride, titanium nitride and alloys thereof, said filaments having diameters in excess of 4 $\mu$m and lengths greater than 150 $\mu$m, and a grain growth modifier in less than 0.1 wt. %, selected from the group consisting of magnesia, nickel oxide and cobalt oxide;

said hard ceramic article having density in excess of 99% of the theoretical density defined by said composition, subsequent to sintering, and said sintered ceramic article having hardness greater than 20 GPa.

The manufacture of hard sintered ceramic cutting inserts made by utilizing the novel composition is also described.

Figure 1:
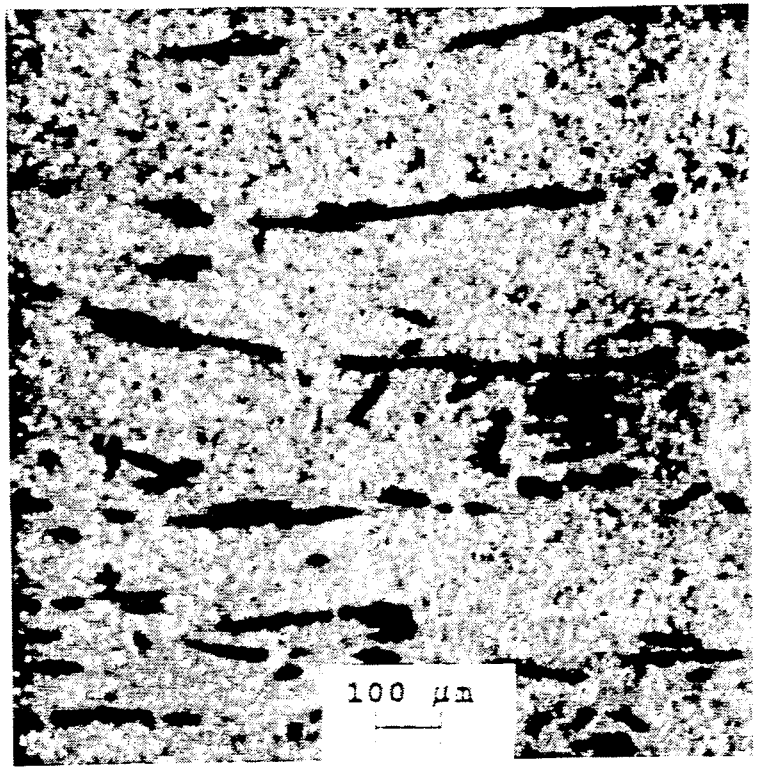
FIG. 1 and FIG. 2 show photo-micrographs of sintered ceramic articles having compositions in accordance with the present invention.

The working of the invention will be illustrated by examples.

BEST MODE OF PRACTISING THE INVENTION

As stated above, compositions for obtaining high density, sintered ceramic articles, based on alumina and other oxides and additionally containing uniformly dispersed particles of refractory carbides, nitrides and borides, have been described in the literature. Ceramic cutting inserts need to have high density, high hardness, low porosity, and furthermore, need to be tough and resistant to wear and chipping. Ceramic whiskers have been conventionally admixed with the alumina-based compositions so as to improve the fracture toughness, wear and chipping resistance. Whiskers, however, are known to lead to cancer. It has now been surprisingly found, that ceramic filaments, which have greater diameters and substantially longer lengths, hence are non-carcinogenic, when added to a ceramic matrix will also satisfactory increase the wear and chipping resistance, and fracture toughness of the hard ceramic articles made of these compositions.

It is to be noted, that whiskers are understood to be formed of single crystals or monocrystals, and have typically less than 3.5 $\mu$m diameter. The diameter of whiskers usually range between 3 and 0.25 $\mu$m. The lengths of such whiskers rarely exceed 100 $\mu$m, but are more commonly about 25 $\mu$m. It is customary but not necessary, that whiskers are produced by chemical vapour deposition (CVD).

Filaments are usually formed as polycrystalline substances having diameters greater than 4 $\mu$m. It is common practice to obtain filaments by pulling long and continuous strands from a melt of a substance. The long continuous strands are often gathered into bundles, and in a cooled state are cut into suitable lengths.

The embedded filaments reinforce and strengthen the alumina and titanium carbonitride containing matrix. Furthermore, the filaments will assist in conducting and dissipating the heat generated in use, for example, in high speed cutting, thereby diminishing crack formation caused by thermal stress. It has also been observed that nitride filaments act as solid state lubricants in high cutting speed operations.

The ceramic articles, more specifically the cutting inserts of the present invention, are made of alumina powder which has less than 2 $\mu$m particle size. The preferred particle size is less than 1 $\mu$m.

As stated above, the hardness of an alumina-based ceramic substance may be increased by admixing titanium carbonitride with the alumina powder. The composition of the carbonitride utilized by the present invention, may be varied in such manner that the ratio of the carbide in the carbonitride to the sum of the carbide and nitride, may vary from 0.1 to 1, that is the fraction C/C+N may have a value ranging from 0.1 to 1. In the preferred embodiment C/C+N ranges from 0.3 to 0.7. The particle size of the titanium carbonitride added to the alumina is smaller than 10 $\mu$m, and the preferred particle size is less than 5 $\mu$m.

Alumina and finely divided titanium carbonitride of the selected carbide-nitride ratio form the matrix of the ceramic composition of the present invention. The preferred composition contains 50–90% by volume alumina and 5–40% by volume titanium carbonitride. The novel composition is obtained by adding polycrystalline filaments of titanium diboride or titanium nitride to the alumina-titanium carbonitride mixture. The filaments are usually added in the form of strands having a typical length of 30 cm, and having diameters usually in excess of 4 $\mu$m. The preferred diameter of the filaments ranges between 4 and 10 $\mu$m. The length of the diboride or nitride filaments depends on the method of manufacture, but it is preferred that the filaments be well in excess of 150 $\mu$m, and even more preferred that the predominant length of the filaments in the alumina-titanium carbonitride mixture range between 0.5–1 mm. As stated hereinabove, the titanium diboride and nitride filaments are polycrystalline.

The mixture usually contains a grain growth modifier in amounts less than 1000 ppm. The grain growth modifier may also act as sintering aid and is selected from magnesia, nickel oxide and cobalt oxide, but other conventional grain growth modifiers may also be used.

The mixture of alumina and titanium carbonitride and the added titanium nitride and/or titanium diboride filaments are wetted with an alcohol, preferably an aliphatic alcohol and milled by conventional methods.

The milled mixture is subsequently cast into required shapes and configurations. In the present application, the milled mixture is used to manufacture conventionally shaped cutting inserts. The prepared ceramic mixture is isostatically hot pressed in an inert gas atmosphere at a temperature higher than 1500° C., preferably higher than 1750° C. The preferred inert gas is argon.

The ceramic cutting inserts and similar ceramic articles may also be obtained by other conventional sintering methods, such as first cold pressing the mixture and subsequently sintering in an inert gas atmosphere at high pressures and high temperatures.

The heat treated cutting insert obtained as described hereinabove was found to have density very close to the theoretical density of the mixture, more specifically, greater than 99% of the theoretical density.

The hardness of the ceramic articles made according to the present invention was usually greater than 20 GPa, and the fracture toughness was found to be in excess of 5.5 MPa.m$^{\frac{1}{2}}$.

The ceramic composition embedding titanium diboride or titanium nitride filaments in an alumina and titanium carbonitride containing matrix is designed to provide relatively inexpensive ceramic cutting inserts. Such cutting inserts are utilized in high speed cutting operations of steel, iron-nickel alloys and articles made of similar high melting point metals.

Other ceramic articles, which are to be utilized in applications where properties such as high hardness, high fracture toughness, high wear resistance and resistance to chipping are desirable, may also be produced by the composition and process of the present invention. The titanium diboride or nitride filaments were found to be embedded in the alumina based matrix, thereby imparting increased strength and good thermal conductivity to the sintered ceramic articles, such as for example, nozzles, engine components, separators, and such like.

Examples to illustrate the implementation of the present invention will be provided hereinbelow.

EXAMPLE 1

Commercially obtainable alumina powder containing 500 ppm magnesia and having particle size below 1 $\mu$m, was mixed with titanium carbonitride having particle size less than 5 $\mu$m. The ratio of carbide to nitride in the carbonitride was 1:1, that is the fraction C/C+N had a value of 0.5. The composition of the mixture of fine particles can be described as Al$_2$O$_3$: 70 vol. %
Ti(CN): 25 vol. %
To the above mixture titanium nitride (TiN) filaments were added in 5 vol %.

The filaments were cut from strands of polycrystalline TiN, and had typical lengths of 30 cm (11.5 inches) and average diameter of 6 $\mu$m.

The alumina, titanium carbonitride and the filaments of titanium nitride were milled together in iso-propanol for 8 hours, then mixed further in a vibromill for another 4 hours. The mixture was cast into commercially sized standard cutting inserts, denoted as SNG 432, forming $\frac{1}{2}$" sided squares.

The cast mixture was subjected to hot isostatic pressing (HIP) in argon by first heating to 1750° C., then slowly raising the temperature to 1850° C. for one hour duration. The cutting inserts obtained were of very high quality, having density 99.6–99.7% of the theoretical density. The hardness of the sintered cutting inserts was found to be 20.8 GPa and the fracture toughness 6.6 MPa.m$^{\frac{1}{2}}$.

A photomicrograph of a section of the cutting insert obtained by the above process is shown on FIG. 1. It may be seen that the titanium nitride filaments are embedded and held in the matrix composed of titanium carbonitride dispersed in alumina.

The average length of the broken up filaments embedded in alumina-titanium carbonitride matrix was well above 150 μm, and typically above 500 μm.

EXAMPLE 2

Commercially available fine alumina particles, having particle size less than 1 μm and containing 500 ppm magnesia, were mixed with fine titanium carbonitride particles having less than 5 μm particle size. The carbide to nitride ratio in the carbonitride solid solution was 70:30, that is the value of the fraction C/C+N was calculated to be 0.7.

The mixture had the following composition:
$Al_2O_3$ = 65 vol. %
$Ti(C_{0.7}N_{0.3})$ = 28 vol. %
To the above mixture titanium diboride (TiB$_2$) filaments were added in 7 vol. %. The TiB$_2$ filaments added to the fine alumina-titanium carbonitride mixture were typically 30 cm long and the average diameter of the filaments was 6 μm.

The mixture was first ball milled and then vibromilled as in Example 1, followed by hot isostatic pressing to standard cutting insert size SNG 432, by the heat treatment method described in Example 1.

The sintered ceramic insert obtained as described above was found to have 99.1% theoretical density and hardness values of 21 GPa. The fracture toughness of the inserts was found to be 6.2 MPa.m$^{\frac{1}{2}}$ measured by the diamond indentation method. The inserts were thus of very high quality.

Figure 2:
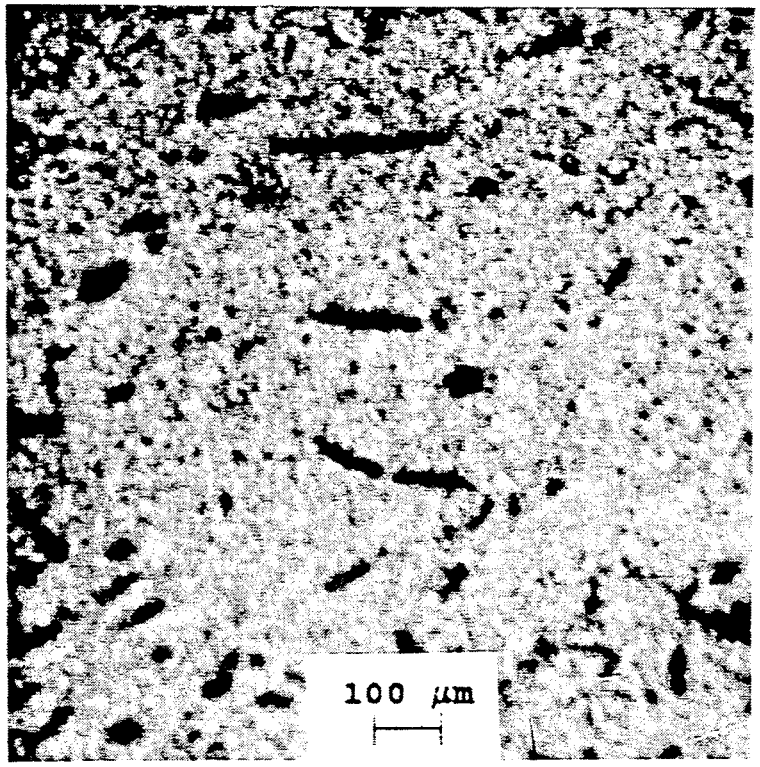

A photomicrograph of a section of the titanium diboride filament containing cutting insert is shown on FIG. 2. The filaments are shown to be embedded in the alumina-titanium carbonitride containing matrix. The average length of the filaments embedded in the alumina-titanium carbonitride matrix was longer than 500 μm.

The hardness of the cutting inserts made according to Examples 1 and 2 was determined by the Vickers indentation method.

EXAMPLE 3

The ceramic cutting inserts obtained as described in Examples 1 and 2 were tested in cutting hardened steel. It is customary that the cutting speed is adjusted to the composition and hardness of the particular steel strip to be cut. In comparing the performance of cutting inserts, it is usual to measure the flank wear rate of the insert after a given length of steel has been cut, or after a given time spent in cutting the steel.

Figure 3:
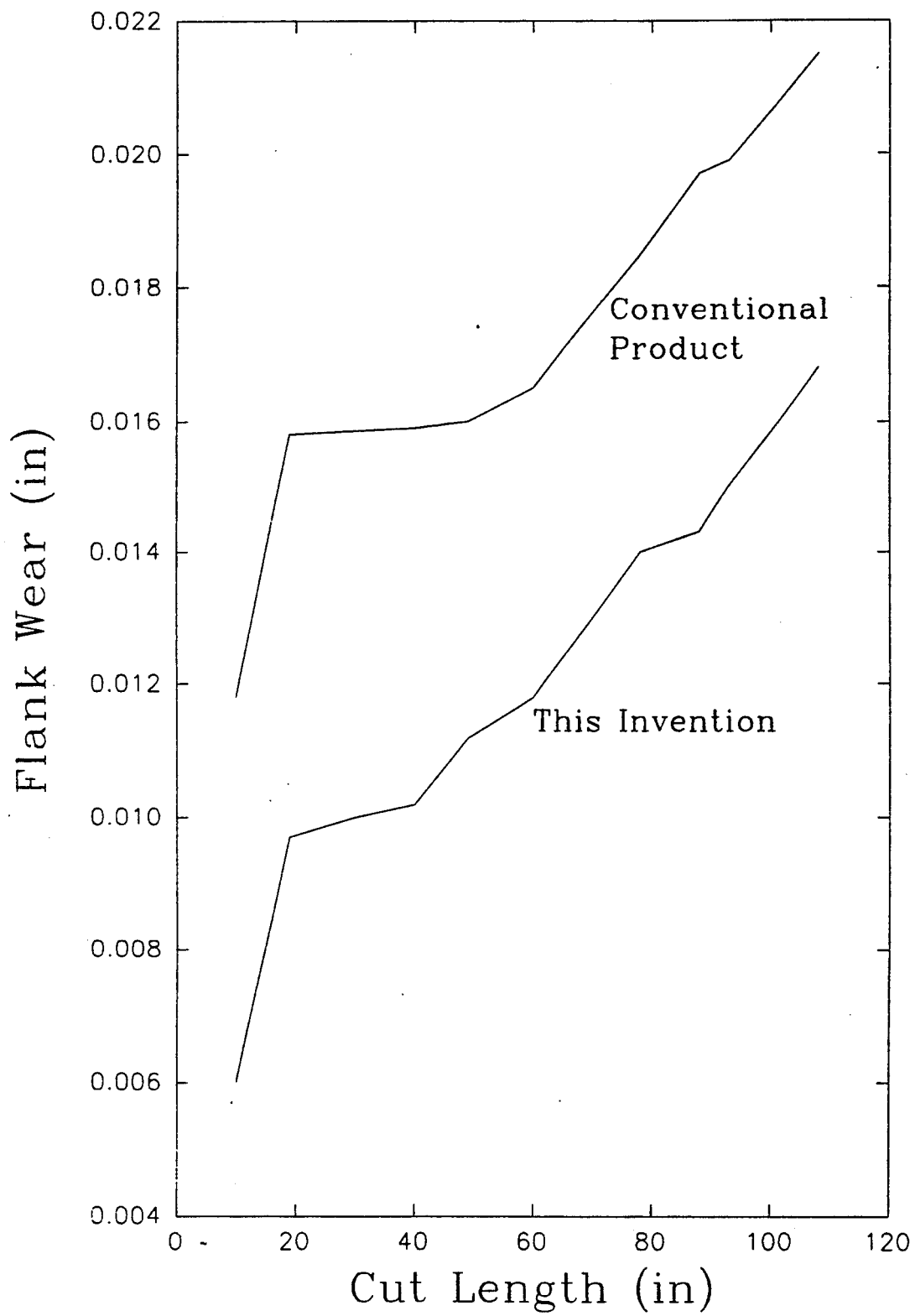
FIGS. 3 and 4 show tests comparing the flank wear of cutting inserts of the present invention with the flank wear of conventional cutting inserts.

4340 steel hardened to Rc 31-33 was machined in the present test. The surface speed of the machining operation was 1000 surface-feet per minute, at a feed rate of 0.004 IPR, the depth of cut being 0.040 inch. On FIG. 3 the flank wear of the cutting insert measured in inches is plotted against the length of steel cut in inches. FIG. 3 shows the flank wear rate of a commercially available conventional cutting insert and that of the cutting insert made according to the present invention.

Figure 4:
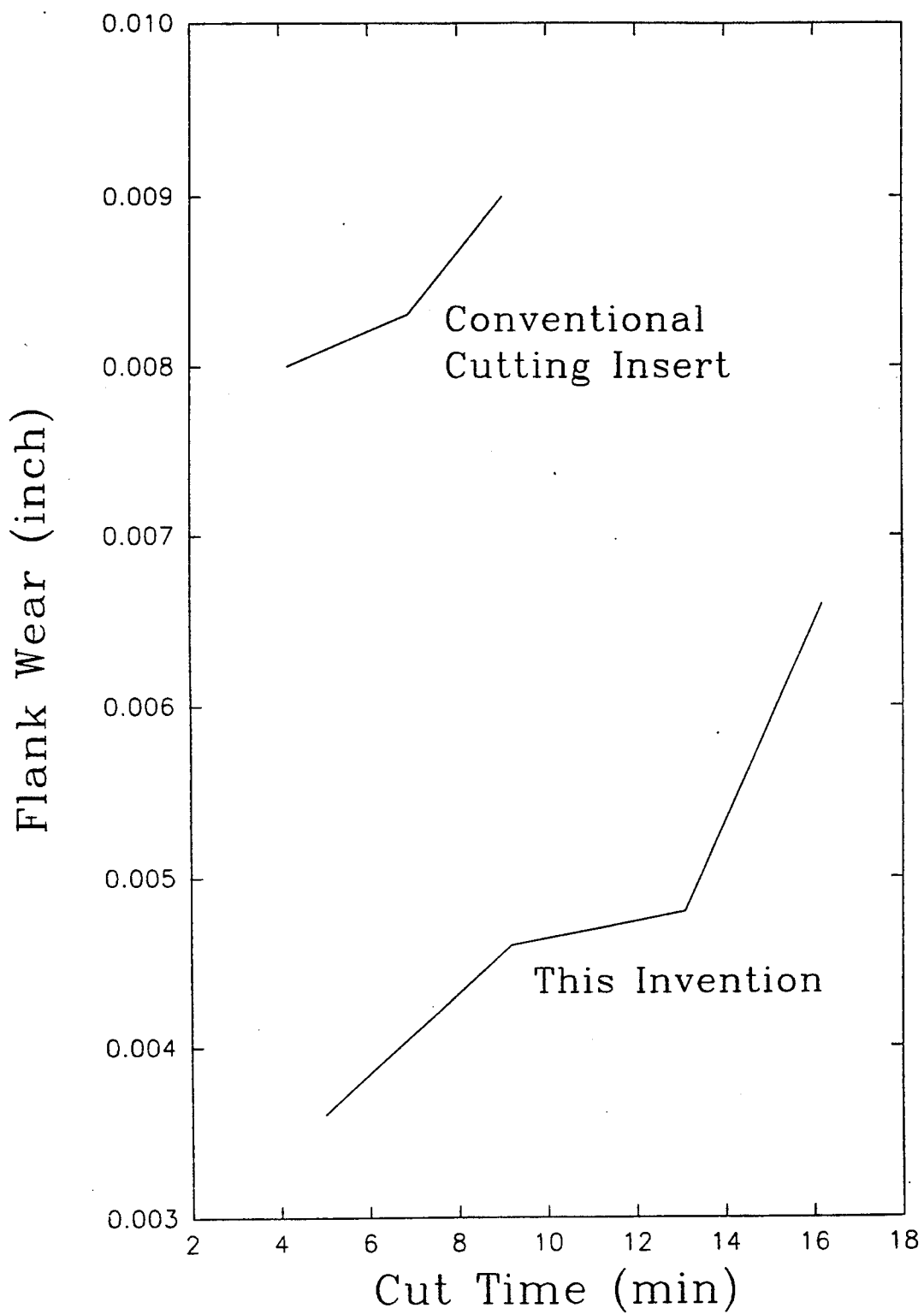

The cutting of a tool steel hardened to Rc 60-61 is illustrated on FIG. 4. The flank wear rate of cutting inserts used in machining the tool steel to depths of 0.020 and 0.040 inches is plotted against the time spent on the cutting operation. The surface speed was 420 and 353 surface-feet per minute, respectively, at feed rate of 0.004 IPR.

The flank wear rate of the cutting inserts of the present invention used in machining tool steel, is compared to the flank wear of conventional cutting inserts on FIG. 4.

It can thus be seen on FIG. 3 and FIG. 4 that ceramic cutting inserts, having either titanium diboride or titanium nitride polycrystalline filaments embedded in the alumina-based matrix are hard, resist chipping and have high wear resistance. Moreover, the embedded filaments substantially increase the fracture toughness of the cutting inserts.

As indicated in the above tests, the inserts made according to the present invention, were capable of performing at high cutting speeds and cutting to the required depth, without thermal cracking. The desired heat conductivity and other advantageous properties imparted by the embedded ceramic filaments are clearly illustrated, thereby providing hard, sintered ceramic articles which are devoid of carcinogenic and other harmful properties attributed to whiskers.

Although the present invention has been described with reference to the preferred embodiments and examples, it is to be understood that modifications and variations may be resorted to without departing from the spirit and scope of the invention, as those skilled in the art readily understand. Such modifications and variations are considered to be within the purview and scope of the invention and the appended claims.

We claim:

1. A composition for a hard, sintered ceramic article, essentially consisting of:
   50–80% by volume alumina,
   5–40% by volume titanium carbonitride, the nitride and carbide content in said carbonitride being defined such that the fraction C/C+N has a value between 0.1 and 1,
   1–30% by volume polycrystalline filaments selected from the group consisting of titanium diboride, titanium nitride and alloys thereof, said filaments having diameters in excess of 4 μm and lengths greater than 150 μm, and a grain growth modifier in less than 0.1 wt. %, selected from the group consisting of magnesia, nickel oxide and cobalt oxide;
   said hard ceramic article having density in excess of 99% of the theoretical density defined by said composition, subsequent to sintering, and said sintered ceramic article having hardness greater than 20 GPa.

2. A composition for a hard sintered ceramic article as claimed in claim 1, wherein said polycrystalline filament has diameter between 4 and 10 μm.

3. A composition for a hard, sintered ceramic article as claimed in claim 1, wherein said value of the fraction C/C+N defining said carbide and nitride contained in said titanium carbonitride falls between 0.3 and 0.7.

4. A sintered ceramic cutting insert having composition essentially consisting of:
   50–80% by volume alumina, 5–40% by volume titanium carbonitride, the nitride and carbide content in the carbonitride being defined such that the fraction C/C+N has a value between 0.1 and 1, 1–30% by volume polycrystalline filaments selected from the group consisting of titanium diboride, titanium nitride and alloys thereof, said polycrystalline filaments having diameters in excess of 4 μm and lengths greater than 150 μm, and a grain growth modifier in less than 0.1 wt. %, selected from the group consisting of magnesia, nickel oxide and cobalt oxide;

said ceramic cutting insert having density in excess of 99% of the theoretical density defined by said composition, subsequent to sintering, and said sintered ceramic cutting insert having hardness values greater than 20 GPa.

5. A sintered ceramic cutting insert as claimed in claim 4, obtained by sintering in inert gas at a temperature higher than 1500° C.

6. A sintered ceramic cutting insert as claimed in claim 4, obtained by hot isostatic pressing.

7. A sintered ceramic cutting insert as claimed in claim 4, having fracture toughness greater than 5.5 MPa.m$^{\frac{1}{2}}$.

* * * * *